US006804331B1

(12) United States Patent
Vacek et al.

(10) Patent No.: US 6,804,331 B1
(45) Date of Patent: Oct. 12, 2004

(54) METHOD, APPARATUS, AND COMPUTER READABLE MEDIA FOR MINIMIZING THE RISK OF FRAUDULENT RECEIPT OF TELEPHONE CALLS

(75) Inventors: Jill M. Vacek, Blair, NE (US); Mark J. Pettay, Omaha, NE (US); Hendryanto Rilantono, Omaha, NE (US); Mahmood S. Akhwand, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 10/156,444

(22) Filed: May 28, 2002

(51) Int. Cl.⁷ .............................................. H04M 1/64
(52) U.S. Cl. ..................... 379/88.02; 704/273; 704/275
(58) Field of Search ........................ 379/265.04, 88.02, 379/88.04, 88.03; 704/273, 275

(56) References Cited

U.S. PATENT DOCUMENTS

| | | |
|---|---|---|
| 3,752,904 A | 8/1973 | Waterbury |
| 4,752,676 A | 6/1988 | Leonard et al. |
| 4,993,068 A | 2/1991 | Piosenka et al. |
| 5,153,918 A | 10/1992 | Tuai |

(List continued on next page.)

OTHER PUBLICATIONS

VoicePrint Security for Credit Cards, IBM Technical Disclosure Bulletin, Feb. 1994, pp. 189–190, vol. 37, Publication No. 2B.

Face Recognition Technology, MATE–CCTV, Ltd., www.mate.co.il.

Niccolai, James, Comdex: Biometrics Puts a Face—or Finger—on Security, InfoWorld Media Group, Inc., Nov. 15, 2001.

(List continued on next page.)

*Primary Examiner*—Fan Tsang
*Assistant Examiner*—Simon Sing
(74) *Attorney, Agent, or Firm*—West Corporation; Rocco L. Adornato

(57) ABSTRACT

Method, apparatus, and computer-readable media for minimizing the risk of fraudulent receipt of telephone calls. The invention described herein provides a method of minimizing fraudulent receipt of telephone calls, with the method including at least the following. One or more authenticated voice samples are associated with at least one person. The person then submits at least one test voice sample during a login process to obtain authorization to receive telephone calls. This test voice samples is captured and the differences between the test voice sample and the one or more authenticated voice samples is quantified. Depending on the degree difference between the at least one authenticated voice sample and the test voice sample, the person's request for authorization to receive telephone calls or training is dispositioned. Apparatus and computer-readable media to realize the above function are also provided herein.

24 Claims, 6 Drawing Sheets

U.S. PATENT DOCUMENTS

| | | | |
|---|---|---|---|
| 5,412,727 A | | 5/1995 | Drexler et al. |
| 5,414,755 A | * | 5/1995 | Bahler et al. ............ 379/88.02 |
| 5,513,250 A | | 4/1996 | McAllister |
| 5,517,558 A | * | 5/1996 | Schalk ..................... 379/88.02 |
| 5,581,630 A | | 12/1996 | Bonneau, Jr. |
| 5,608,784 A | * | 3/1997 | Miller ..................... 379/88.02 |
| 5,623,539 A | * | 4/1997 | Bassenyemukasa et al. ....................... 379/88.02 |
| 5,634,086 A | | 5/1997 | Rtischev et al. |
| 5,638,430 A | | 6/1997 | Hogan et al. |
| 5,666,157 A | | 9/1997 | Aviv |
| 5,819,029 A | | 10/1998 | Edwards et al. |
| 5,838,768 A | | 11/1998 | Sumar et al. |
| 5,862,325 A | | 1/1999 | Reed et al. |
| 5,872,834 A | | 2/1999 | Teitelbaum |
| 5,884,262 A | | 3/1999 | Wise et al. |
| 5,903,225 A | | 5/1999 | Schmitt et al. |
| 5,915,001 A | | 6/1999 | Uppaluru |
| 5,940,476 A | * | 8/1999 | Morganstein et al. .... 379/88.02 |
| 5,987,155 A | | 11/1999 | Dunn et al. |
| 6,011,858 A | | 1/2000 | Stock et al. |
| RE36,580 E | | 2/2000 | Bogosian, Jr. |
| 6,038,334 A | | 3/2000 | Hamid |
| 6,049,602 A | * | 4/2000 | Foladare et al. ....... 379/265.04 |
| 6,058,303 A | | 5/2000 | .ANG.strom et al. |
| 6,070,241 A | | 5/2000 | Edwards et al. |
| 6,078,807 A | * | 6/2000 | Dunn et al. ................. 455/410 |
| 6,084,967 A | | 7/2000 | Kennedy |
| 6,091,835 A | | 7/2000 | Smithies et al. |
| 6,092,192 A | | 7/2000 | Kanevsky et al. |
| 6,094,476 A | * | 7/2000 | Hunt et al. ............... 379/88.04 |
| 6,119,084 A | * | 9/2000 | Roberts et al. ............. 704/246 |
| 6,144,938 A | | 11/2000 | Surace et al. |
| 6,149,056 A | | 11/2000 | Stinson et al. |
| 6,157,707 A | | 12/2000 | Baulier et al. |
| 6,167,517 A | | 12/2000 | Gilchrist et al. |
| 6,246,751 B1 | | 6/2001 | Bergl et al. |
| 6,246,988 B1 | * | 6/2001 | Schier ........................ 704/273 |
| 6,266,640 B1 | * | 7/2001 | Fromm ....................... 704/273 |
| 6,275,940 B1 | | 8/2001 | Edwards et al. |
| 6,320,956 B1 | | 11/2001 | Cherry |
| 6,359,971 B1 | | 3/2002 | Haimi-Cohen et al. |
| 6,370,508 B2 | | 4/2002 | Beck et al. |
| 6,401,066 B1 | | 6/2002 | McIntosh |
| 6,404,747 B1 | | 6/2002 | Berry et al. |
| 6,493,446 B1 | | 12/2002 | Cherry |
| 6,501,956 B1 | | 12/2002 | Weeren et al. |
| 6,604,075 B1 | | 8/2003 | Brown et al. |
| 6,650,736 B1 | | 11/2003 | Unger et al. |

OTHER PUBLICATIONS

Bruce, Laura, Face–Scanning, Fingerprinting ATMs Gain Ground, Bankrate.com, Mar. 2, 2001.

Panasonic Authenticam Iris Recognition Camera, www.panasonic.com.

Pearson, Helen, Stats Say Aye to ID Eye, Nature News Service, www.nature.com.

Iris Recognition Could Smooth Identification, The Instrumentation, Systems, and Automation Society, www.isa.org, Jul. 31, 2000.

Yang, S. Jae, A New Look In Security, PC Magazine, www.pcmag.com, Jan. 15, 2002.

Iris Recognition: The Technology, www.iris–scan.com.

Fingerprint and Eye Iris Pattern Identification Software, Libraries and Source Code, Neurotechnologija, Ltd., www.neurotechnologija.com, Apr. 15, 2002.

Triton Secure, www.tritonsecure.com.

U.S. patent Office Recognizes New Multifunction Telecommunications Technology, Business Wire, Inc., Jun. 6, 1989.

Moving Into The Future, Newsweek, Apr. 29, 2002, p. 40.

Voicelog, VoiceLog Appoints Karl Erickson As Chief Technology Officer, Press Release, www.voicelog.com, Oct. 7, 2002.

Voicelog, VoiceLog Announces "Verifiably Able" New Program Offers Meaningful Employment to Physically Challenged, Press Release, www.voicelog.com, May 28, 2002.

Voicelog, VoiceLog Announces New Operations Center Added Location Provides Additional Capacity, Redundancy, Reliability, Press Release, www.voicelog.com, Mar. 1, 2002.

Voicelog, VoiceLog Announces Live Operator Third Party Verification, Press Release, www.voicelog,com, May 1, 2001.

Voicelog, VoiceLog Announces Package for New FCC Rules, Press Release, www.voicelog.com, Jan. 30, 2001.

Voicelog, VoiceLog and TSS AG (Switzerland) Bring Third Party Verification to Europe, Press Release, www.voicelog.com, Jan. 17, 2001.

Voicelog, VoiceLog Announces Voice Recognition for Third Party Verifications, Press Release, www.voicelog.com, Nov. 4, 1997.

Voicelog, VoiceLog Announces Winter Weather Insurance For Third Party Verifications, Press Release, www.voicelog.com, Oct. 31, 1997.

Voicelog, VoiceLog Guarantees Third Party Verification Compliance, Press Release, www.voicelog.com, Sep. 23, 1997.

Voicelog, VoiceLog Announces Free Speech TPV –Speech Recognition–Based Verification At Touchtone Prices, Press Release, www.voicelog.com, Jan. 6, 2004.

Voicelog, VoiceLog Offers Third Party Verification for Wireless Number Portability , Press Release, www.voicelog,com, Oct. 31, 2003.

Voicelog, Bray Joins VoiceLogs as Director of Live Operator Verification Services, Press Release, www.voicelog.com, Oct. 28, 2003.

Voicelog, VoiceLog Offers Sarbanes–Oxley Employee Hotline Solution, Press Release, www.voicelog.com, Oct. 7, 2003.

Voicelog, VoiceLog Makes INC 500 List of Fastest–Growing Private Companies Second Straight Year, Press Release, www.voicelog.com, Oct. 3, 2003.

Voicelog, VoiceVerified Helps Telemarketers Meet New FTC Sales Rule, Press Release, www.voicelog.com, May 1, 2003.

Voicelog, VoiceLog Scores A Win For Telecom Industry Against "Drop–Off" Rule Seeks Partners for Potential Suit Against FCC to Overturn, Press Release, www.voicelog.com, Mar. 27, 2003.

Voicelog, VoiceLog Helps Telemarketers Meet New Telephone Sales Rule by Mar. 31 Deadline, No Need to Make Capital Investment to Record Telemarketing Sales, Press Release, www.voicelog.com, Mar. 12, 2003.

Voicelog, VoiceLog Passes Half–Million Mark for Live Operator Verification Services Adds New Features and Functionality, Press Release, www.voicelog.com, Feb. 24, 2003.

Voicelog, VoiceLog Ranked 77th in Inc Magazine's "Inc 500" for 2002, Press Release, www.voicelog.com, Oct. 15. 2002.

Voicelog, VoiceLog Appoints Karl Erickson As Chief Technology Officer, Press Release, www.voicelog.com, Oct. 7, 2002.

Voicelog, VoiceLog Announces "Verifiably Able" New Program Offers Meaningful Employment to Physically Challenged, Press Release, www.voicelog.com, May 28, 2002.

Voicelog, VoiceLog Announces New Operations Center Added Location Provides Additional Capacity, Redundancy, Reliability, Press Release, www.voicelog.com, Mar. 1, 2002.

Voicelog, VoiceLog Announces Live Operator Third Party Verification, Press Release, www.voicelog.com, May 1, 2001.

Voicelog, VoiceLog Announces Package for New FCC Rules, Press Release, www.voicelog.com, Jan. 30, 2001.

Voicelog, VoiceLog and TSS AG (Switzerland) Bring Third Party Verification to Europe, Press Release, www.voicelog.com, Jan. 17, 2001.

Voicelog, VoiceLog Announces Voice Recognition for Third Party Verifications, Press Release, www.voicelog.com, Nov. 4, 1997.

Voicelog, VoiceLog Guarantees Third Party Verification Compliance, Press Release, www.voicelog.com, Sep. 23, 1997.

Voicelog, California Leads the Nation in Slamming Control, Press Release, www.voicelog.com, Mar. 27, 1998.

Voicelog, VoiceLog Announces CPNI Verification Products, Press Release, www.voicelog.com, Mar. 4, 1998.

Voicelog, VoiceLog's 50 State "Anti–Slamming Rules Report" Available on the Internet, Press Release, www.voicelog.com, Feb. 4, 1998.

Voicelog, VoiceLog Announces Cost Effective Verification for Electric Service, Press Release, www.voicelog.com, Jan. 6, 1998.

Voicelog, VoiceLog Reached 100 Accounts in 1997, Press Release, www.voicelog.com, Jan. 2, 1998.

Voicelog, VoiceLog and Telecommunications On Demand Announce Distribution Agreement, Press Release, www.voicelog.com, Nov. 12, 1997.

Voicelog, VoiceLog Offers Industry–Wide Solution to "Cramming", Press Release, www,voicelog.com, Apr. 21, 1998.

Voicelog, VoiceLog Third Party Verification Releases Free Analysis of New FCC Anti–Slamming Rules, Press Release, www.voicelog.com, Feb. 9, 1999.

Voicelog, VoiceLog Meets Anti–Slamming Rules for E–Commerce Internet Orders, Press Release, www.voicelog,com, Jan. 27, 1999.

Voicelog, VoiceLog Announces "Quick Freeze" "The New Third Party Verification Program for Carrier Freezes" to Meet the FCC Anti–Slamming Rules, Press Release, www.voicelog,com, Jan. 12, 1998.

Voicelog, VoiceLog Closes 1998 With Two Million Third Party Verification Transactions–Now the Leader in Preventing Slamming, Press Release, www.voicelog, com, Jan. 30, 1998.

Voicelog, VoiceLog Third Party Verification Helps Telecommunications Industry Meet New FCC Anti–Slamming Rules, Press Release, www.voicelog,com, Dec. 20, 1998.

Voicelog, VoiceLog Is First Choice for Third Party Verification, Press Release, www.voicelog, com, Aug. 10, 1998.

Voicelog, Total Slamming Control –The Ultimate in Third Party Verification, Press Release, www.voicelog, com, May 11, 1998.

Voicelog, VoiceLog Releases Study on State Attitudes Toward FCC Anti–Slamming Rules, Press Release, www.voicelog, com, Apr. 14, 1999.

Voicelog, VoiceLog Third Party Verification Releases Updated Anti–Slamming Rules Report, Press Release, www.voicelog, com, Mar. 16, 1999.

Voicelog, VoiceLog Announces Web Interface for Verification Retrievals and Audio Playback, Press Release, www.voicelog, com.

Voicelog, VoiceLog Announces Dual Channel Recording, Press Release, www.voicelog, com, Jan. 4, 2000.

Voicelog, VoiceLog Announces High Quality Name and Address Transcription, Press Release www.voicelog,com, Feb. 1, 2000.

Voicelogm, VoiceLog Goes to the Ends of the Earth to Review Third Party Verification, Press Release, www.voicelog, com, Feb. 29, 2000.

Voicelog, FCC Acknowledges Validity, Value of Automated Third Party Verification, Press Release, www.voicelog, com, Aug. 24, 2000.

Voicelog, VoiceLog Announces True State–Specific Third Party Verification, Press Release, www.voicelog,com, May 9, 2000.

Voicelog, VoiceLog Announces Easy Recording Download Function, Press Release, www.voicelog, com. Mar. 1, 2000.

Voicelog, VoiceLog Announces Inbound that Delivers, Press Release, www.voicelog,com, Oct. 2, 2000.

\* cited by examiner

METHOD, APPARATUS, AND COMPUTER READABLE MEDIA FOR MINIMIZING THE RISK OF FRAUDULENT RECEIPT OF TELEPHONE CALLS

CROSS-REFERENCE TO RELATED APPLICATIONS

The instant application contains subject matter related to U.S. patent application Ser. No. 10/108,227, filed on Mar. 27, 2002, having the same title as the instant application, and now abandoned.

BRIEF DESCRIPTIONS OF THE DRAWINGS

DETAILED DESCRIPTION OF ILLUSTRATIVE EMBODIMENTS

Overview of the invention

Figure 1:
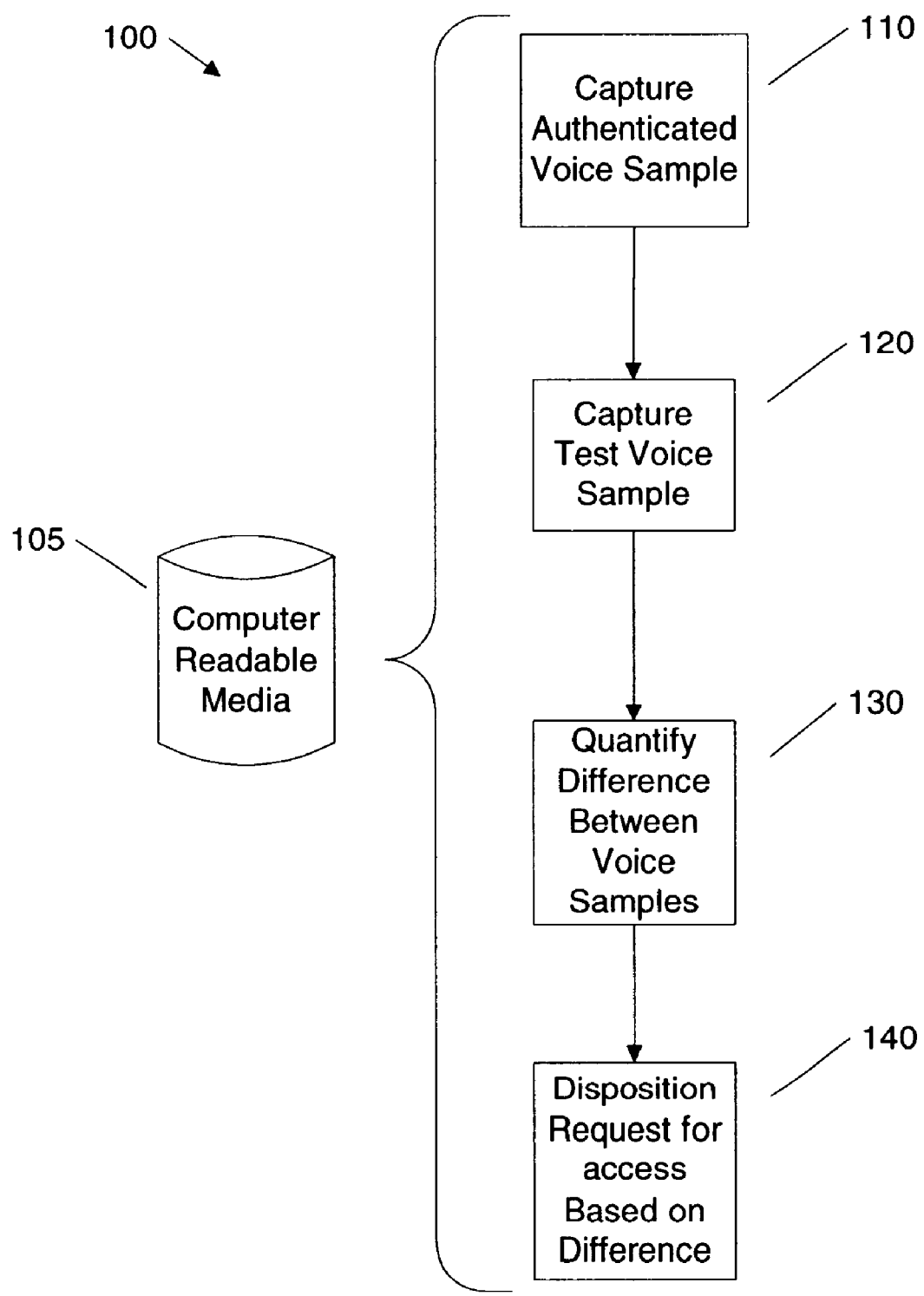
FIG. 1 is a flowchart illustrating a process flow provided according to an illustrative embodiment of the invention.

FIG. 1 is a flowchart illustrating a process flow 100 provided according to an illustrative embodiment of the invention. More specifically, the invention provides a method of minimizing fraudulent receipt of telephone calls by seeking to ensure that the person receiving and processing calls in a call center or home agent environment is the same person screened during the employment clearance process and trained to handle those calls during instruction programs. The invention helps to minimize the risk of an imposter fraudulently accessing call center resources to redirect goods/services ordered by call center clients to themselves. The invention may be applicable in either a conventional call center setting or a home agent setting, wherein the agent accepts and processes call center calls from a physical location remote from the call center site, such as the agent's home.

Figure 3:
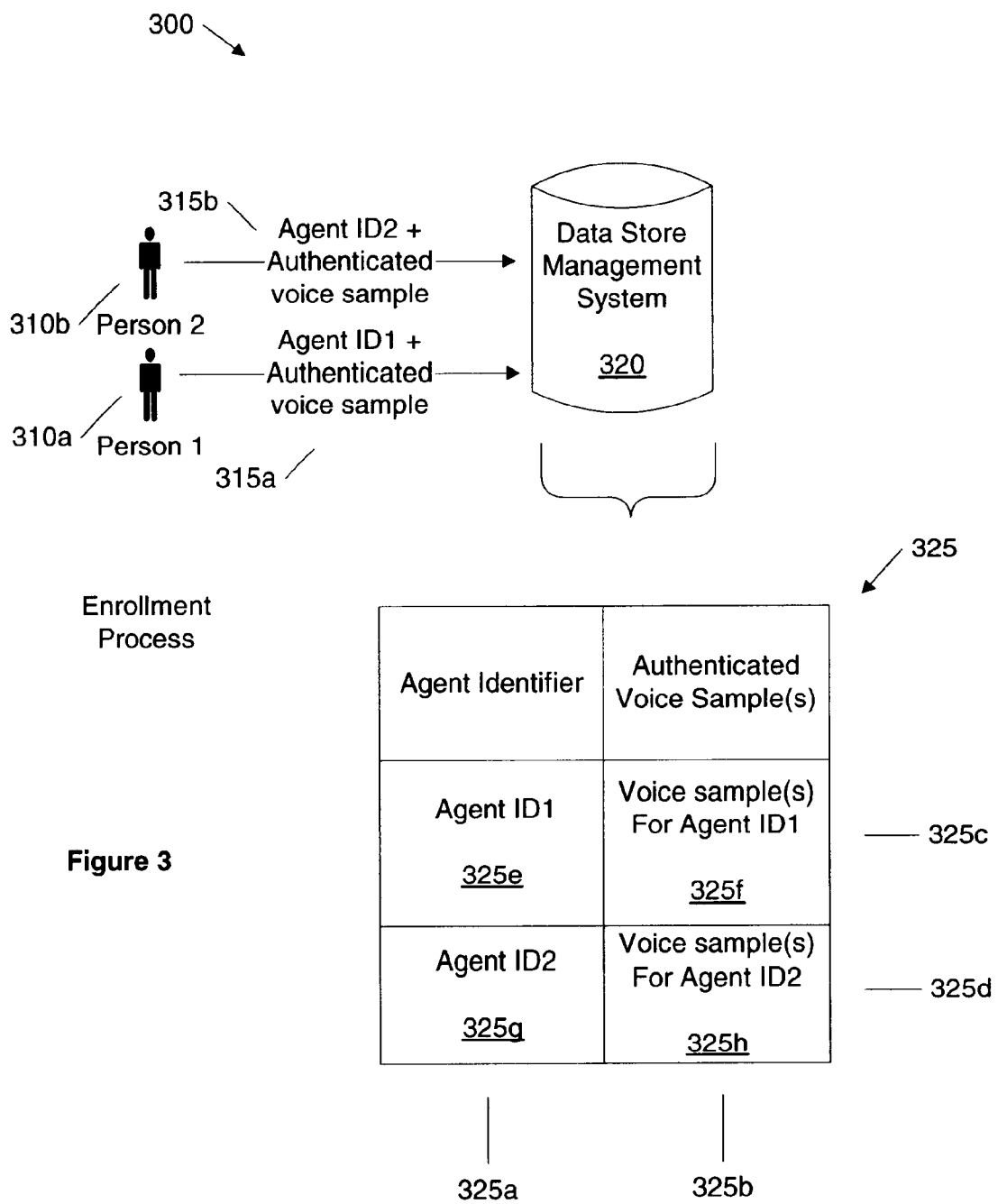
FIG. 3 is a block diagram illustrating an enrollment process performed according to an illustrative embodiment of the invention.
Figure 4:
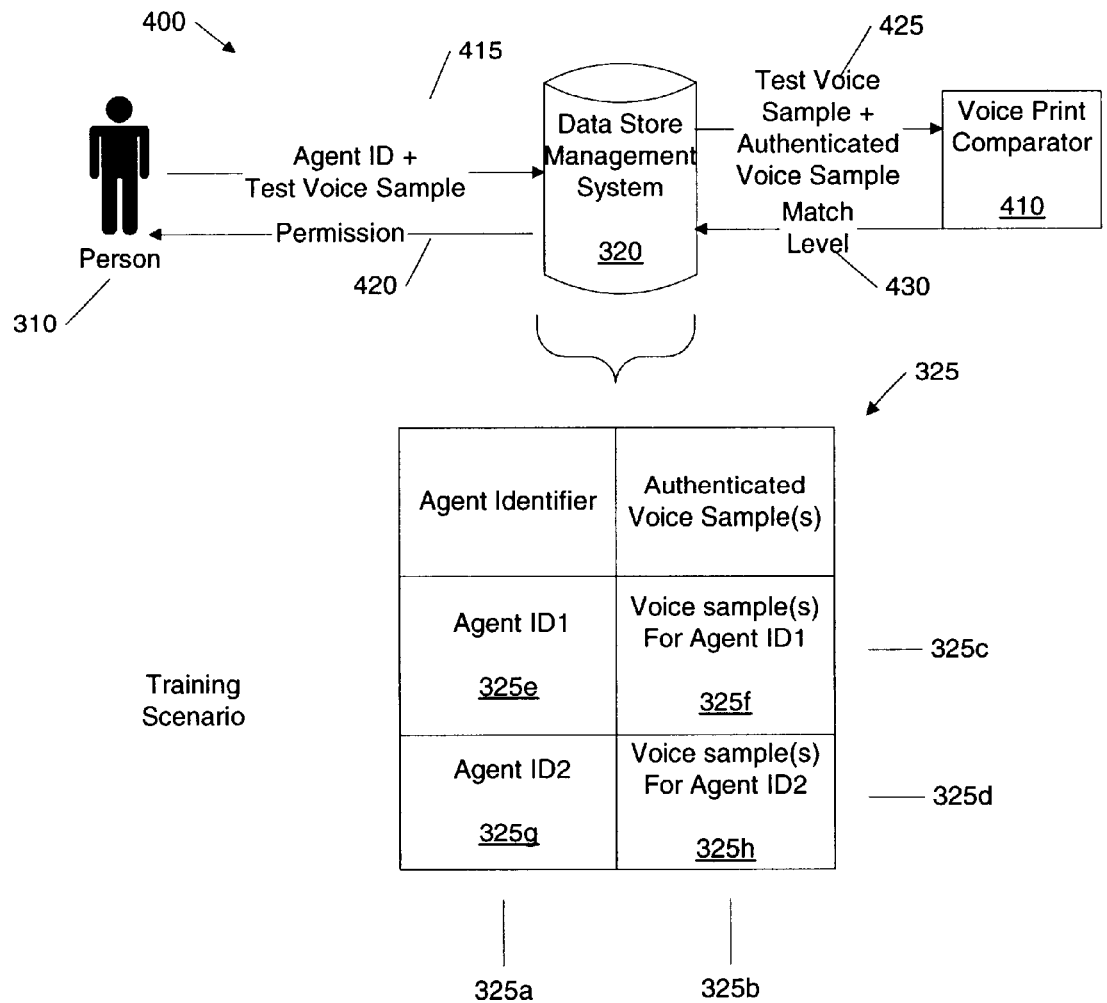
FIG. 4 is a block diagram of a training scenario performed according to an illustrative embodiment of the invention.
Figure 5:
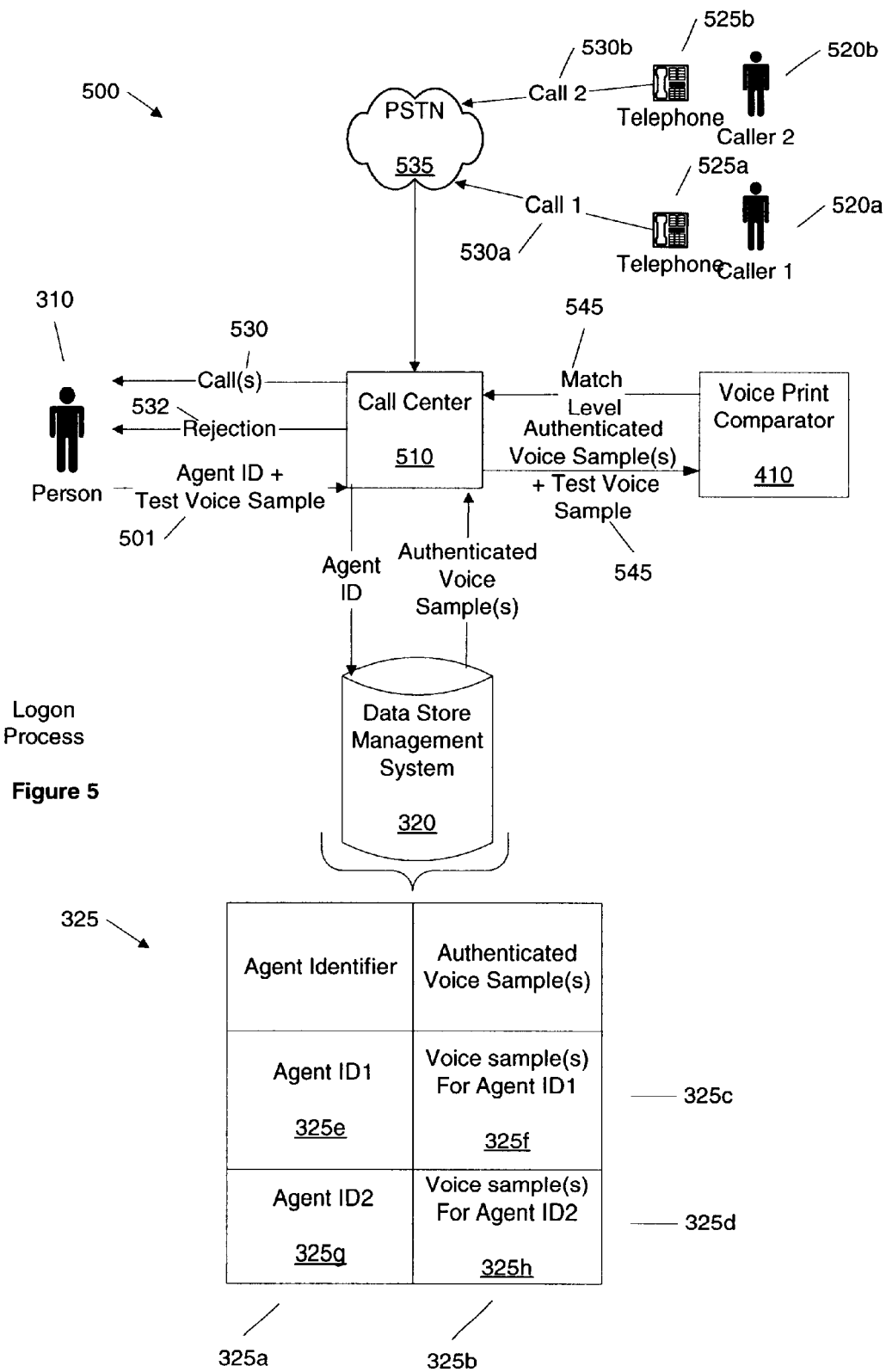
FIG. 5 is a block diagram of a log-on process performed according to an illustrative embodiment of the invention.

As shown in block 110 of FIG. 1, an illustrative embodiment of the invention includes capturing an authenticated voice sample of at least one person (represented as 310 in FIGS. 3–5). In the context of this specification, the term "authenticated voice sample" refers to a voice sample obtained from the person 310 in a face-to-face or other interaction, wherein the entity obtaining the voice sample from the person 310 is able to determine with reasonable certainty that the person 310 is actually who he or she purports to be. This verification can be obtained by reviewing identification documents provided by the person, judging their authenticity, or by other suitable security measures as may be known to those skilled in the art.

At least one test voice sample of the person 310 is captured when that person 310 is submitting a request for authorization to receive training or to process telephone calls (block 120). In the context of this specification, the term "test voice sample" refers to a voice sample obtained from the person 310 that is of unknown authenticity, and needs to be verified as genuine or authentic. Finally, the method includes quantifying a difference between the authenticated voice sample and the test voice sample (block 130), and dispositioning the request for authorization based upon this difference (block 140).

Figure 2:
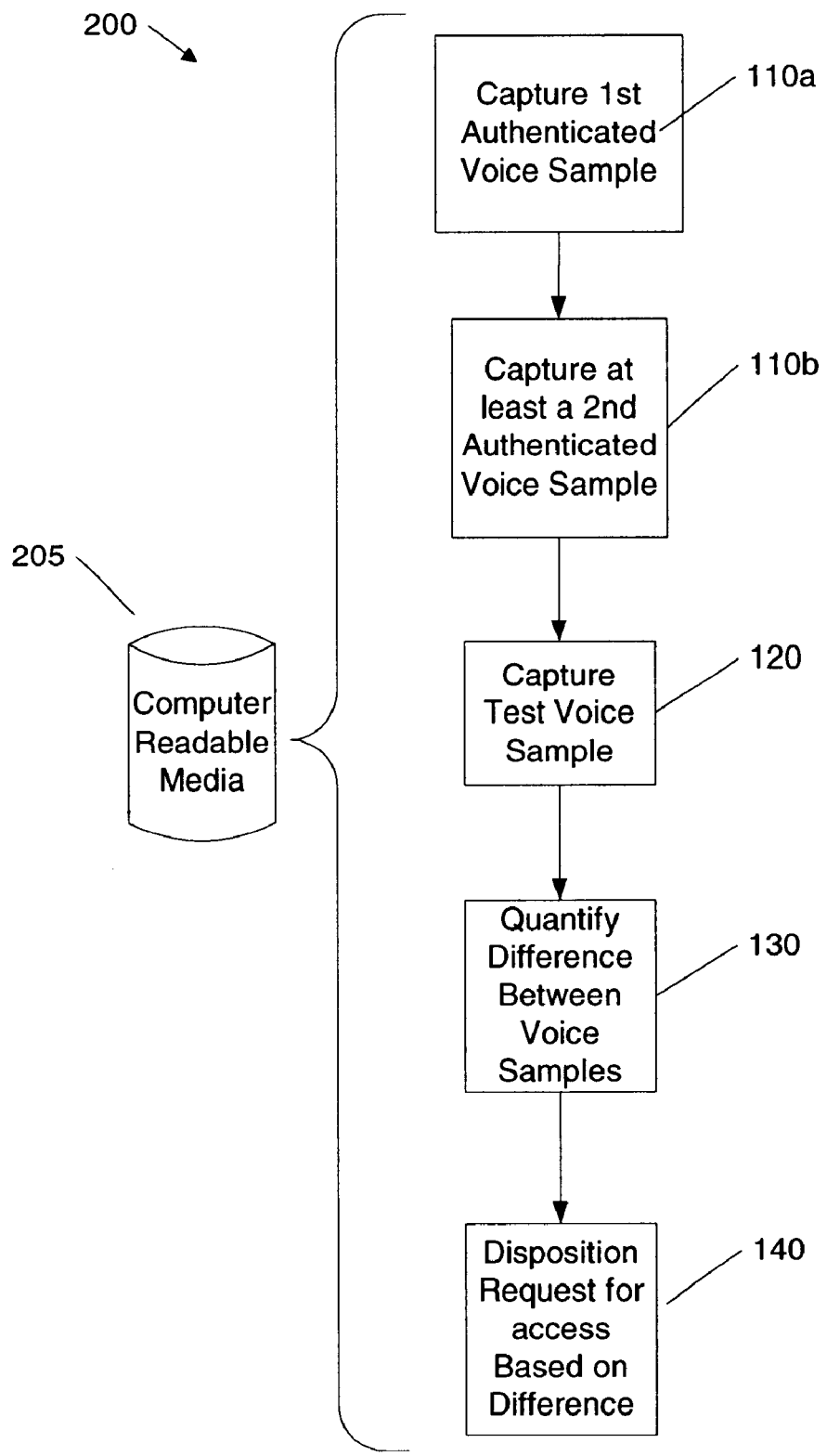
FIG. 2 is a flowchart illustrating a process flow provided according to another illustrative embodiment of the invention.

FIG. 2 is a flowchart illustrating a process flow 200 provided according to another illustrative embodiment of the invention. The FIG. 2 embodiment of the method includes capturing not only a first (block 110a) but also a second (block 110b) authenticated voice sample of the person 310 submitting a request for authorization. The remaining processing shown in FIG. 2 remain substantially unchanged from FIG. 1.

As discussed in further detail below, the first authenticated voice sample of the person 310 can be obtained during a first meeting with the person 310, such as an initial interview or human resources screening. The second authenticated voice sample of the person 310 can be obtained during a second, subsequent meeting with that person 310, such as for a training session(s). The method of the invention as illustrated in FIG. 1 can be employed during the second meeting with that person 310 to authenticate the second voice sample. After that second voice sample is authenticated, it can then become a second authenticated voice sample, thereby providing two separate authenticated voice samples for later use.

FIG. 3 is a block diagram illustrating apparatus used to implement an enrollment process 300 performed according to an illustrative embodiment of the invention. Such apparatus may be suitable for practicing the processing represented by the blocks 110 and 110a in FIGS. 1 and 2. As a non-limiting example, the enrollment process 300 illustrated in FIG. 3 can include capturing an authenticated voice sample from a person 310a or 310b when that person 310a or 310b submits an employment application for a position as a teleservices agent at either a call center or as a home agent. FIG. 3 illustrates two persons 310a and 310b, with each of the two persons providing respective information shown respectively as 315a and 315b to be stored in a data store management system 320. Each person 310a and 310b provides a respective unique agent identifier, along with an authenticated voice sample to be stored in the data store management system 320, which agent identifier and voice sample are collectively shown as 315a and 315b. The agent identifier can be, for example, a social security number or other unique identifier provided by the person 310 or by the prospective employer.

FIG. 3 also illustrates a data structure 325 that may be used to construct the data store management system 320, with the data structure 325 including a first field 325a for the unique agent identifier and a second field 325b for authenticated voice samples associated with each unique agent identifier. Rows 325c and 325d store respective entries for persons 310a and 310b, while columns 325a and 325b store agent ID and voice sample data, respectively. Column 325a serves as a search index or key field, enabling the data store management system 320 to retrieve a voice sample associated with a given agent ID by locating the given agent ID in column 325a, and pulling the corresponding voice sample from column 325b. Specifically, the cell 325e contains the agent identifier data for one of the persons 310a or 310b, while cell 325f contains one or more authenticated voice samples for that person 310a or 310b. Similarly, cell 325g contains agent identifier data for the other of the persons 310a or 310b, while the cell 325h contains one or more authenticated voice samples for the other of the persons 310a or 310b.

Those skilled in the art will understand that the invention is not limited to the data structure 325 shown in FIG. 3. Specifically data structure 325 and data store management system 320 could be adapted or modified to store data associated with any number of respective persons 310. Further, the format, layout, and structure of the data structure 325 as illustrated in FIG. 3 can be modified by those skilled in the art as necessary or convenient for a given implementation of the invention as described herein. Specifically, additional fields may be added, deleted, or modified as suitable. The configuration shown in FIG. 3 is shown only for convenience in illustrating and describing various aspects of the invention. Two persons 310a and 310b are shown in FIG. 3 for convenience in describing this aspect of the invention.

The data store management system 320 may be realized by a variety of commercially available data base management systems. Suitable systems are available from vendors such as Microsoft, IBM/Informix, or other vendors.

According to various aspects of the invention, the various voice samples discussed herein may consist of a standard or uniform phrase that must be repeated each time a voice sample is taken. For example, this standard phrase may be a greeting used by a teleservices agent to greet callers. However, depending on various implementations of the invention as described herein, the voice samples may or may not need to consist of the exact same phrase.

FIG. 4 is a block diagram of a training apparatus and process 400 provided according to an illustrative embodiment of the invention. The apparatus shown in FIG. 4 may be useful for practicing the processing represented by block 110b in FIG. 2, along with blocks 120 and 130 shown in FIGS. 1 and 2. The training scenario 400 illustrated in FIG. 4 assumes that at least a first authenticated voice sample has been captured previously, such as at the time of an initial human resources interview or application process, as illustrated in FIG. 3 above. The FIG. 4 embodiment includes capturing a second voice sample during a subsequent session involving the person 310 who applied previously for the agent position, and authenticating this voice sample as genuine, using, for example, the method illustrated in FIG. 1. In this manner, the identity of the person 310 reporting to this subsequent session is confirmed to match the identity of the person 310 who applied originally for the position, and was screened or cleared accordingly, serving to minimize the risk of fraudulent or incompetent handling of phone calls by the person 310.

As shown in FIG. 4, the person 310 presents his or her agent ID, plus the test voice sample to be authenticated, shown collectively as 415, to be store in the data store management system 320. At least the test voice sample and an authenticated voice sample, shown collectively as 425, are forwarded to a voice print comparator 410, which compares the test voice sample to a previously authenticated voice sample associated with that person 310. The previously authenticated voice sample corresponding to the person 310 may be retrieved by the data store management system 320 from the data structure 325, using the agent identifier 325a obtained from the person 310 as an index into this data store management system 320. The voice print comparator 410 generates a match signal 430 indicating the level of consistency between the input voice samples, thereby quantifying the match between the two or more voice samples. If there is a sufficient match between the test voice sample and the one or more authenticated voice samples, the person 310 is granted permission (420) to receive training, and the test voice sample is authenticated as a further authenticated voice sample and stored in the data store column 325b associated with the agent identifier provided by the person 310 requesting training.

Voice print comparator 410 may be implemented using voice authentication or speech recognition technology. Suitable technology is commercially available from a wide variety of vendors, such as, for example, Nuance Corporation™ of Menlow Park, Calif. (www.nuance.com). However, it will be understood by those skilled in the art that the invention may be implemented using voice authentication or speech recognition technology from a wide variety of vendors, and is not limited to any particular vendor. This voice authentication or speech recognition technology, from whatever vendor, will be understood to provide a voice authentication or speech recognition engine as referenced elsewhere in this specification.

FIG. 5 is a block diagram of a log-on apparatus and process 500 provided according to an illustrative embodiment of the invention. The apparatus as shown in FIG. 5 may be suitable for practicing the processing represented by blocks 120, 130, and 140 as shown in FIGS. 1 and 2. The log-on process 500 illustrated in FIG. 5 begins by capturing a test voice sample and agent ID, shown collectively as 501, when the person 310 submits a request to access call center 510 to process telephone calls received by the call center 510. Example telephone calls 530a and 530b are routed to the call center 510 through public-switched telephone network (PSTN) 535. Example callers 1 and 2, shown respectively by the reference numbers 520a and 520b, interact with call center 510 using telephones 525a and 525b.

According to various embodiments of the invention, the person 310 requesting access to the call center 510 may be a teleservices agent reporting for duty at the physical location of the call center 510, or may be a remote or home agent logging on to access computerized resources of the call center 510 from a location remote from the call center 510, such as the residence of the home agent.

As shown in FIG. 5, when the person 310 attempts to log into the call center 510, the person 310 submits a unique agent identifier and a test voice sample, shown collectively as 501. Upon receiving this data 501, the call center 510 retrieves one or more authenticated voice samples from the data store management system 320 using the agent identifier as an index or key field for a search, as discussed above. The call center 510 then forwards the authenticated voice sample (s) and the test voice sample, shown collectively as 540 to the voice print comparator 410 for analysis. The voice print comparator 410 then compares the authenticated voice sample(s), pulled from column 325b of the data structure 325, to the test voice sample obtained from the person 310 to determine how closely they match, as indicated by a match level signal 545 sent to the call center 510. The call center 510 then analyzes the match level signal 545 obtained from the voice print comparator 410 and determines whether to grant access permission to the person 310 attempting to log in. If the match level signal 545 returned from the voice print comparator 410 is sufficiently high, the call center 510 will grant the log in request submitted by the person 310. The person 310 will then have access to call center resources to process calls 530 from/to respective callers 520a and 520b. Otherwise, the call center 510 will reject the logon request, represented by arrow 532.

Figure 6:
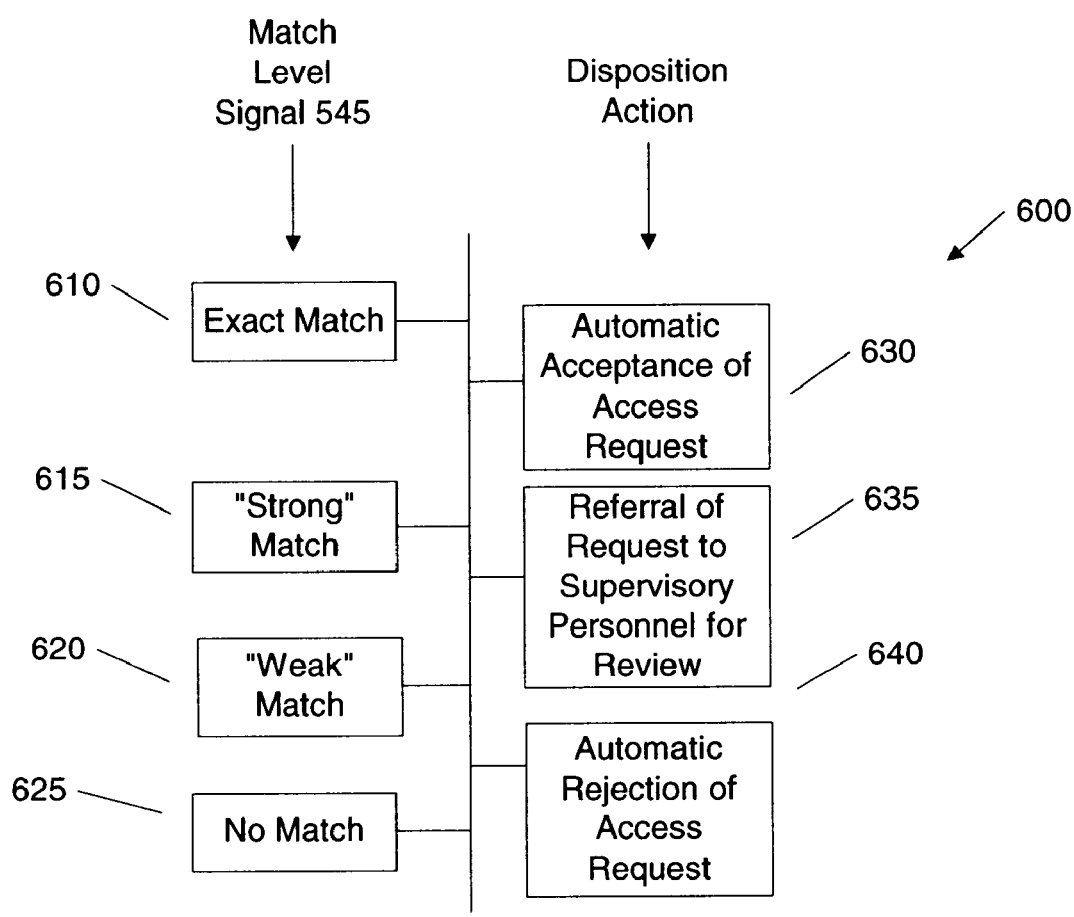
FIG. 6 is a block diagram illustrating a thresholding process employed by an illustrative embodiment of the invention, and actions related to that process.

FIG. 6 is a block diagram illustrating a thresholding process 600 employed by an illustrative embodiment of the invention, and follow-up actions related thereto. This thresholding process 600 may be employed by the call center 510 dispositioning the requests for access submitted by the person 310, represented by block 140 in FIGS. 1 and 2. The block diagram of FIG. 6 illustrates a process of defining at least a first threshold value for the difference between the one or more authenticated voice samples associated with a given agent ID, and the test voice sample submitted by the person 310 purporting to own the agent ID. As shown in FIG. 6, the match level signal 545 (as output by voice print comparator 410) between the authenticated voice sample(s) and the test voice sample may be characterized as an exact match 610, a strong match 615, a weak match 620, or no match whatsoever 625. If the match level signal 545 falls between the threshold for an exact match 610 and a strong match 615, the logon request may be automatically accepted (block 630) without further processing.

If the match level signal 545 falls between the thresholds for a strong match 615 and a weak match 620, the logon request may be referred to supervisory personnel for review and processing (block 635). This referral process 635 may include having the person 310 con tact supervisory personnel by telephone or otherwise. In addition, an e-mail or other communication can be routed to supervisory personnel describing the situation as well. The supervisory personnel can then discuss the matter with the person 310, and if the supervisory personnel are satisfied as to the identity of the person 310, then the supervisory personnel may grant the person's log in request. Otherwise, the supervisory personnel will reject the logon request.

If the match level signal 545 falls between the thresholds for a weak match 620 and no match whatsoever 625, the logon request may be automatically rejected (block 640). Follow-up action may be taken to investigate the person 310 submitting the request for access associated with processing shown in blocks 635 and 640.

The thresholds 610, 615, 620, and 625 are shown for illustrative purposes only; any number of discrete thresholds can be employed according to various aspects of the invention. Further, these thresholds may be associated with various values of the match level signal 545, the values of which in turn depend on the output specified for the voice print comparator 410. Those skilled in the art will understand that the values of the match level signal 545 assigned to these various thresholds may readily be adjusted or fine-tuned as may be dictated by the circumstances or requirements of a given application of the invention without departing from the scope of the invention.

As those skilled in the art will understand, a program of instructions can be loaded and stored onto a program storage media or devices 105 and 205 (see FIGS. 1 and 2) that is readable by a computer or other machine, embodying a program of instructions executable by the machine to perform the various aspects of the method as discussed and claimed herein, and as illustrated in the Figures. Generally speaking, the program storage media 105 and 205 can be implemented using any technology based upon materials having specific magnetic, optical, semiconductor or other properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, various embodiments of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage devices 105 and 205 can be affixed permanently or removably to a bay, socket, connector, or other hardware provided by the cabinet, motherboard, or other component of a given computer system.

Those skilled in the art will also understand that one or more computers programmed in accordance with the above teaching using known programming languages provides means for realizing the various functions, methods, and processes as described and claimed herein and as illustrated in the drawing figure attached hereto. Those skilled in the art can implement a suitable application program executing the various aspects of the method discussed above and shown in the drawing figures using any suitable programming or scripting language. However, it will be understood that the invention as described herein is not dependent on implementation in any particular operating system, environment, or programming language. Example operating systems include without limitation LINUX, UNIX, any of the Windows™-family of operating systems, or others, and example languages include without limitation a variety of structured and object-oriented languages such as C, C++, Visual Basic, or others.

Various embodiments of the invention are described above to facilitate a thorough understanding of the various aspects of the invention. However, these embodiments are to be understood as illustrative rather than limiting in nature and those skilled in the art will recognize that various modifications or extensions of these embodiments will fall within the scope of the invention, which is defined by the appended claims. For example, while the specification describes various functions and processes, and illustrates apparatus capable of performing those processes, those skilled in the art will recognize that the various functions, processes, and data flows may be adapted, modified, or otherwise altered in various implementations of the teaching contained therein without departing from the scope of the invention.

We claim:

1. A method of minimizing fraudulent receipt of telephone calls, the method comprising at least the following:

capturing at least one authenticated voice sample of at least one person;

capturing at least one test voice sample of the at least one person when the at least one person is submitting a request for one of training and authorization to receive at least one of the telephone calls;

quantifying a difference between the at least one authenticated voice sample and the at least one test voice sample, including defining a first and at least a second threshold value for the difference between the authenticated voice sample and the test voice sample; and dispositioning the request by automatically rejecting the request and sending an e-mail notification to at least one live supervisor if the difference is more than the at least second threshold value.

2. The method of claim 1, wherein capturing the at least one authenticated voice sample is performed when the at least one person submits an application for a position as a teleservices agent.

3. The method of claim 1, wherein capturing the at least one authenticated voice sample includes capturing a first and at least a second authenticated voice sample of the at least one person.

4. The method of claim 3, wherein capturing at least one authenticated voice sample includes capturing the first authenticated voice sample at the time of an initial human resources interview with the at least one person and capturing the at least second authenticated voice sample is performed at a training session involving the at least one person.

5. The method of claim 1, wherein capturing at least one test voice sample is performed when the at least one person submits a request to access a computerized system to receive telephone calls processed by the computerized system.

6. The method of claim 1, wherein capturing at least one test voice sample is performed during a log-on process during which a teleservices agent requests to access resources of a call center from a location remote from the call center.

7. The method of claim 1, wherein sending the e-mail notification to the at least one supervisor includes sending an e-mail notification identifying the at least one person.

8. The method of claim 1, wherein quantifying a difference is performed by a voice authentication engine.

9. Apparatus for minimizing fraudulent receipt of telephone calls, the apparatus comprising at least the following:
 means for capturing at least one authenticated voice sample of at least one person;
 means for capturing at least one test voice sample of the at least one person when the at least one person is submitting a request for one of training and authorization to receive at least one of the telephone calls;
 means for quantifying a difference between the at least one authenticated voice sample and the at least one test voice sample, including defining a first and at least a second threshold value for the difference between the authenticated voice sample and the test voice sample; and
 means for dispositioning the request by automatically rejecting the request and sending an e-mail notification to at least one live supervisor if the difference is more than the at least second threshold value.

10. A program storage device readable by a machine, embodying a program of instructions executable by the machine to perform a method for minimizing fraudulent receipt of telephone calls, the method comprising at least the following:
 capturing at least one authenticated voice sample of at least one person;
 capturing at least one test voice sample of the at least one person when the at least one person is submitting a request for one of training and authorization to receive at least one of the telephone calls;
 quantifying a difference between the at least one authenticated voice sample and the at least one test voice sample, including defining a first and at least a second threshold value for the difference between the authenticated voice sample and the test voice sample; and
 dispositioning the request by automatically rejecting the request and sending an e-mail notification to at least one live supervisor if the difference is more than the at least second threshold value.

11. The apparatus of claim 9, wherein the means for capturing the at least one authenticated voice sample is adapted to capture the at least one authenticated voice sample when the at least one person submits an application for a position as a teleservices agent.

12. The apparatus of claim 9, wherein the means for capturing the at least one authenticated voice sample is adapted to capture a first and at least a second authenticated voice sample of the at least one person.

13. The apparatus of claim 12, wherein the means for capturing at least one authenticated voice sample is adapted to capture the first authenticated voice sample at the time of an initial human resources interview with the at least one person and to capture the at least second authenticated voice sample at a training session involving the at least one person.

14. The apparatus of claim 9, wherein the means for capturing at least one test voice sample is adapted to capture the at least one test voice sample when the at least one person submits a request to access a computerized system to receive telephone calls processed by the computerized system.

15. The apparatus of claim 9, wherein the means for capturing at least one test voice sample is adapted to capture the at least one test voice sample during a log-on process during which a teleservices agent requests to access resources of a call center from a location remote from the call center.

16. The apparatus of claim 9, wherein the means for sending the e-mail notification to the at least one supervisor is adapted to send an e-mail notification identifying the at least one person.

17. The apparatus of claim 9, wherein the means for quantifying a difference includes a voice authentication engine.

18. The method performed by the program storage device of claim 10, wherein capturing the at least one authenticated voice sample is performed when the at least one person submits an application for a position as a teleservices agent.

19. The method performed by the program storage device of claim 10, wherein capturing the at least one authenticated voice sample includes capturing a first and at least a second authenticated voice sample of the at least one person.

20. The method performed by the program storage device of claim 19, wherein capturing at least one authenticated voice sample includes capturing the first authenticated voice sample at the time of an initial human resources interview with the at least one person and capturing the at least second authenticated voice sample is performed at a training session involving the at least one person.

21. The method performed by the program storage device of claim 10, wherein capturing at least one test voice sample is performed when the at least one person submits a request to access a computerized system to receive telephone calls processed by the computerized system.

22. The method performed by the program storage device of claim 10, wherein capturing at least one test voice sample is performed during a log-on process during which a teleservices agent requests to access resources of a call center from a location remote from the call center.

23. The method performed by the program storage device of claim 10, wherein sending the e-mail notification to the at least one supervisor includes sending an e-mail notification identifying the at least one person.

24. The method performed by the program storage device of claim 10, wherein quantifying a difference is performed at least in part by a voice authentication engine.

* * * * *